Patented Jan. 14, 1930

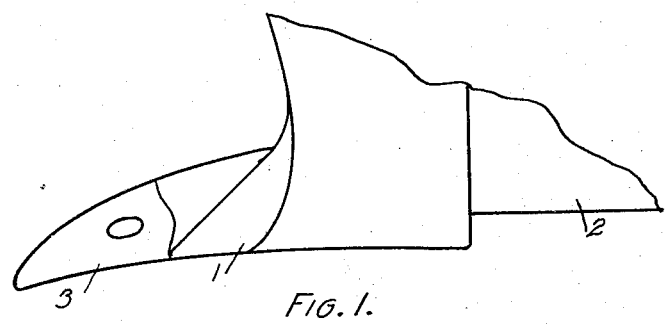
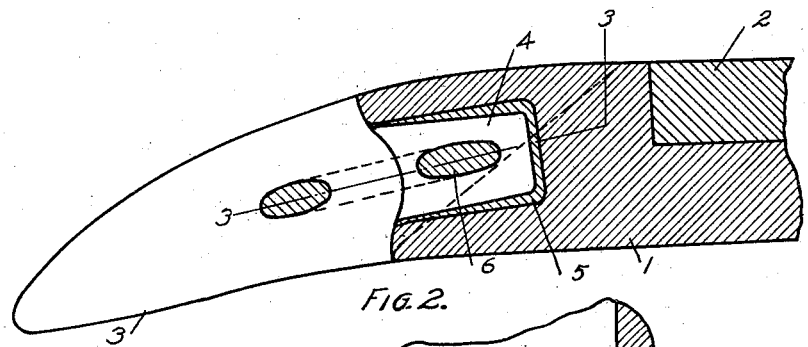
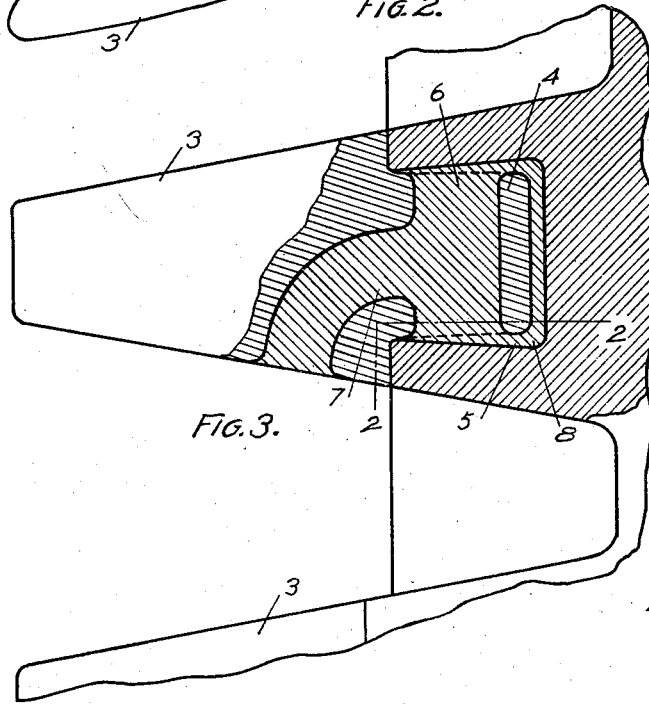

1,743,890

UNITED STATES PATENT OFFICE

EDWARD L. HARRINGTON, OF ERIE, PENNSYLVANIA, ASSIGNOR TO G. H. WILLIAMS COMPANY, OF ERIE, PENNSYLVANIA, A CORPORATION OF PENNSYLVANIA

BUCKET-TOOTH MOUNTING

Application filed October 29, 1926. Serial No. 144,958.

Buckets, such as drag-line, clam shell and other digging implements are provided with teeth along the cutting lip and these are subjected to very severe strains. In order to take care of these strains such teeth are commonly made of material that practically precludes the machining of the teeth so as to make a close fitting union between the teeth and the lips to which they are secured. It is necessary, however, if the parts are to sustain the shocks to which the structure is subjected that the teeth be very rigidly secured to the bucket. This invention is designed to accomplish this purpose. Features and details of the invention will appear from the specification and claims.

The invention is illustrated in the accompanying drawings as follows:—

Fig. 1 shows a side elevation of a bucket end showing the extending tooth.

Fig. 2 an enlarged view, partly in section, of the bucket lip on the line 2—2 in Fig. 3.

Fig. 3 is a section on the line 3—3 in Fig. 2.

1 marks the bucket lip and 2 the bucket shell. These may be made of any ordinary construction and only a part of such lip and shell is shown.

Teeth 3 extend from the lip and these are provided with shanks 4. The shanks 4 extend into sockets 5 in the edge of the lip. The sockets are preferably slightly undercut, or larger at the bottom than at the outer edge of the socket. The shoulder between the body of the tooth and the shank is seated against the end of the lip.

The tooth is provided with a cross passage 6 and this cross opening, or passage, is connected by a passage 7 with the outer surface of the tooth, preferably at one side of the tooth.

A filling 8 is cast in the socket around the shank. Ordinarily this filling is formed of spelter, or other metal preferably a metal that shrinks little, if any, in the cooling. It is run into place through the opening 7 with the shank in place in the socket. The spelter material is heated and preferably the lip and parts are also heated and the spelter material is poured through the passage 7 filling the cross passage 6 and the space in the socket between the walls of the shank and socket. In this way the tooth is rigidly secured in the socket.

What I claim as new is:—

1. In a bucket tooth mounting, the combination of a bucket lip having a tooth socket therein; a tooth having a shank extending into the socket and leaving a space between the shank and the walls of the socket, said tooth having a shoulder between the shank and the body of the tooth seated on the lip; and a metal filler in the socket between the walls of the socket and the shank and surrounding the shank.

2. In a bucket tooth mounting, the combination of a bucket lip having tooth sockets therein; a tooth having a shank extending into the socket and having a space between the shank and the walls of the socket, the walls of the socket being undercut, said tooth having a shoulder between the shank and the body of the tooth seated on the lip; and a metal filler in the socket between the walls of the socket and the shank and surrounding the shank.

3. In a bucket tooth mounting, the combination of a bucket lip having a tooth socket therein; a tooth having a shank extending into the socket and leaving a space between the shank and the walls of the socket, said tooth having a passage through the shank leading from outside of the socket to the space in the socket; and a metal filler in the socket between the walls of the socket and the shank.

4. In a bucket tooth mounting, the combination of a bucket lip having a tooth socket therein; a tooth having a shank extending into the socket and leaving a space between the shank and the walls of the socket; and a passage leading from the side of the tooth into the space between the walls of the shank and the socket; and a metal filler in the socket between the walls of the socket and the shank.

In testimony whereof I have hereunto set my hand.

EDWARD L. HARRINGTON.